Feb. 18, 1969   R. H. BUNDUS   3,428,231
SEPARATION OF FROZEN HOG SKINS
Filed April 12, 1967
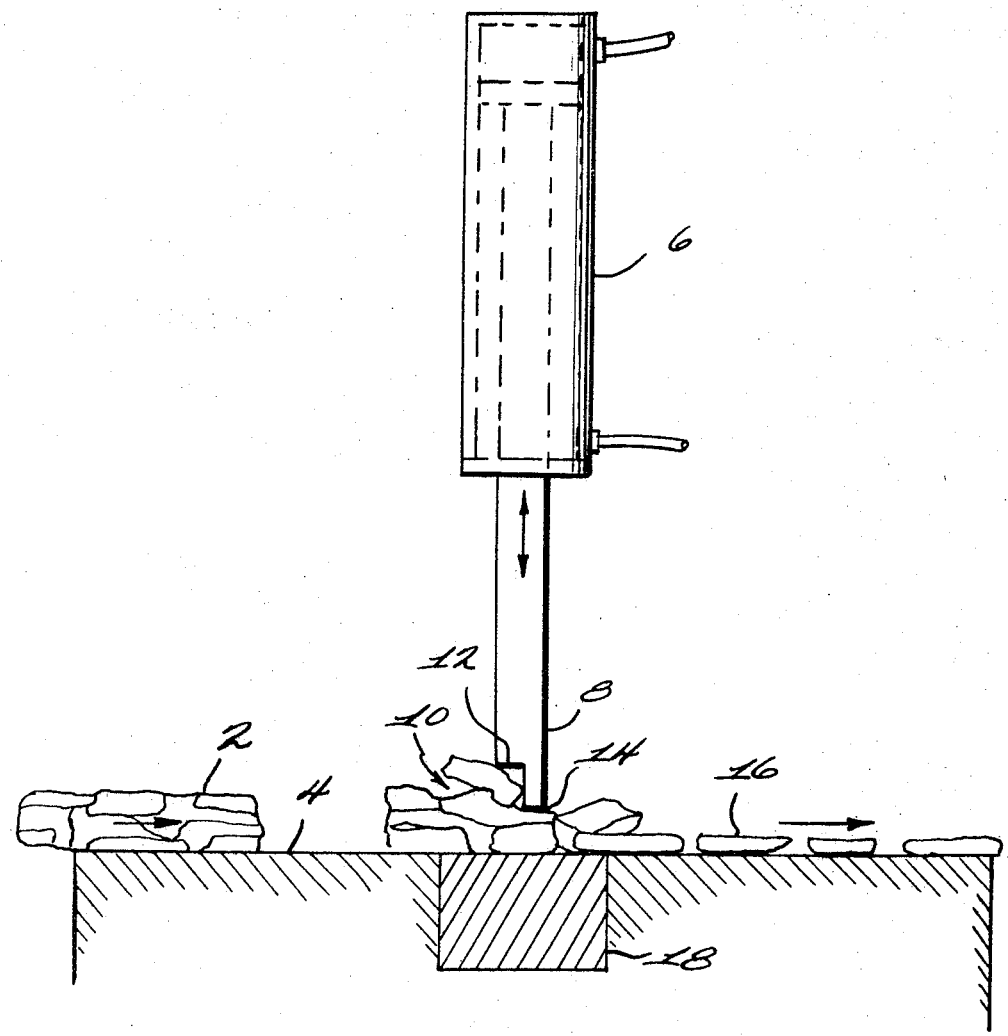
INVENTOR
Robert H. Bundus
BY Cushman Darby & Cushman
ATTORNEYS 3,428,231
SEPARATION OF FROZEN HOG SKINS
Robert H. Bundus, Riverside, Ill., assignor to Beatrice
Foods Co., Chicago, Ill., a corporation of Delaware
Filed Apr. 12, 1967, Ser. No. 630,392
U.S. Cl. 225—1                                    4 Claims
Int. Cl. B26f *3/00, 3/02;* B02c *1/00*

ABSTRACT OF THE DISCLOSURE

Frozen hog rinds are separated by the use of a hydraulic ram which shatters the ice crystals without damage to the rinds. Preferably a two step ram is employed to first reduce the thickness of the frozen rinds to 4 to 6 inches and then to two inches.

---

The present invention relates to the separation of frozen hog skins or rinds.

Commercially available hog rind is shipped in randomly packed frozen blocks that require subsequent processing to separate the skins into individual units. Heretofore this has been done by a long, cumbersome process of thawing the frozen block, thereby melting the ice between the skins and rendering them as free pieces. This process requires considerable time, space and temperature control. It is very difficult to carry out because of the handling and stacking problems involved.

It is an object of the present invention to develop an improved method for separating frozen hog rind into individual pieces.

Another object is to separate frozen hog rinds without damage to the product.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and frozen hog rind pieces can be separated rapidly and efficiently by a process involving the use of brute force. It has been found that the ice crystals between the hog rind pieces and holding them together will shatter under high stress impact without damage to the hog (pig) rind.

The device preferably employed is a hydraulic ram with a stepped head.

The invention will be understood best in connection with the accompanying drawing wherein:

The single figure is a somewhat schematic vertical elevation illustrating the apparatus and method employed.

Referring more specifically to the drawings a frozen block of hog rind 2 having a height of 9–12 inches, width of 18 inches to 2 feet and a length of 2½ to 4 feet is fed slowly in the horizontal direction of the arrow along belt 4 into the jaws of a hydraulic ram 6. The hydraulic ram moves in the vertical directions of the double headed arrow perpendicular to the movement of the frozen block 2. The hydraulic ram has a stepped head 8. When the first step 12 of the ram hits the block of frozen hog rinds as shown generally at 10 it smashes the ice crystals so that the resultant block is reduced to a thickness of 4 to 6 inches and then when the block advances to where it is hit by the second step 14 of the ram the block is reduced to a thickness of about 2 inches. At this point the pork rind is in individual pieces 16 and is readily subject to fast thawing and subsequent processing.

As shown in the drawing a lower support member 18 is provided in the area where the ram hits the frozen hog rind.

As shown in the drawing the height of the frozen hog rind block is reduced in two stages. Obviously there could be used 3, 4, 5 or more stages in reducing the thickness of the rind although normally there is no added advantage in using more than two stages. Also a one step ram can be used although with reduced efficiency since with rams which are commercially available it is not possible to reduce the normal frozen hog rind block to individual pieces by a single impact with the ram.

When the frozen hog rind block is hit with the hydraulic ram it moves forward and sideways. The stock spreads out as it is being rammed.

When the ram is started in operation the front portion of the frozen block is hit by the high step 12 of the ram. After operation is commenced, however, the front portion of the frozen block is hit by the lower step 14 of the ram while the back portion of the frozen block is hit by the higher step 12 of the ram. Since the frozen block is fed in a slow, inching fashion there is normally no need to stop the movement of the belt 4 while the block is contacted by the ram, although if desired forward movement of the belt can be stopped momentarily.

The procedure of the present invention has the advantage that while the ice crystals between the individual hog rinds are shattered there is no damage to the rinds themselves. The process reduces the handling problems and there is no problem of what to do with a stack of hog rinds as the ice melts.

The separated hog rinds can be fried to make a snack food or can be used for other purposes.

What is claimed is:

1. A process of separating a stack of hog rinds held together by ice comprising impacting said stack with sufficient force to shatter the ice and thereby separate the rinds, said impacting being in a plurality of stages whereby the height of the stack is partially reduced in a first stage and the height of the partially reduced stack is reduced to the height of an individual hog rind in a second stage.

2. A process according to claim 1 wherein said first and second stages are carried out simultaneously whereby a front portion of said stack is reduced to the height of an individual rind while a rear portion of said stack is partially reduced to said individual height.

3. A process according to claim 2 wherein said individual rings are then allowed to thaw.

4. A process according to claim 3 wherein said stack moves horizontally and the impacting force is in a vertical direction.

References Cited

UNITED STATES PATENTS

| 2,595,237 | 5/1952 | Fox | 241—283 X |
| 3,021,035 | 2/1962 | Hill | 241—283 |
| 3,081,956 | 3/1963 | Carriere | 241—283 |

JAMES M. MEISTER, *Primary Examiner.*

U.S. Cl. X.R.

225—103; 241—283